Patented Nov. 4, 1947

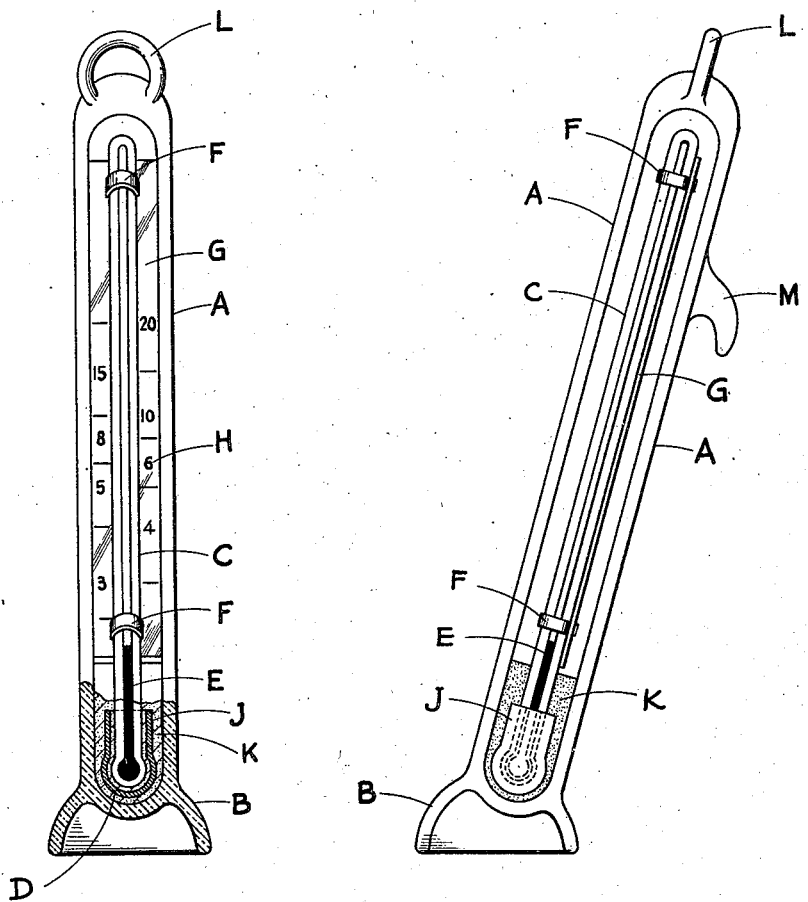

2,430,290

UNITED STATES PATENT OFFICE 2,430,290

INSTRUMENT FOR INDICATING DEGREES OF COOKING

Ellsworth S. Hann, Cleveland Heights, Ohio

Substituted for abandoned application Serial No. 383,777, March 17, 1941. This application March 18, 1946, Serial No. 655,197

2 Claims. (Cl. 73—374)

This invention relates to instruments for indicating the time required for the boiling of articles of food, such as eggs, and has for its general object to provide an instrument of this character which will indicate accurately and visually the extent of cooking to which articles of this character have been subjected, irrespective of the actual time employed in the cooking operation.

In carrying out my invention in the embodiment thereof shown herein, I employ an instrument of the general character of a liquid thermometer, but insulate the bulb and lower portion of the liquid column, whereby the mercury or other heat-expansible liquid will respond but slowly to temperature increases. I then provide the instrument with a scale graduated in terms of units of time, said graduations corresponding to the positions which the top of the column assumes when subjected to the action of boiling water for the times respectively indicated thereon.

In the drawings hereof, Fig. 1 represents a front elevation, with the lower portion broken away, of an instrument constructed in accordance with my invention; and Fig. 2 a side elevation of the instrument shown in Fig. 1.

Describing the parts illustrated herein by reference characters, A denotes an external casing, which may be of glass or similar heat-withstanding transparent material. The casing is provided with a base flange B, preferably approximating a segment of a hollow sphere made by passing a plane therethrough at an angle other than a right angle with respect to a radius extending axially of the casing. This base flange enables the instrument to be placed in a receptacle with its lower end remote from the side thereof and with its upper end in proximity to or in contact with the side.

Mounted centrally within the cylindrical casing A is a liquid thermometer comprising the usual indicating tube C having a bulb D at the lower end thereof, said tube having therein heat responsive liquid, as mercury, indicated at E. Secured to the tube C as by clips F is an elongated backing plate G which is provided with graduations H to indicate, in term of units of time, the amount of cooking to which articles, with which my instrument is to be used, are subjected.

In order to render the material of the heat-responsive liquid E capable of performing its function, it is necessary to slow down its ability to respond to the temperature of the liquid in which it may be immersed whereby the said liquid may be maintained at a boiling temperature for a long interval of time, say for twenty minutes, before the column will have expanded sufficiently to enable the top thereof to reach the point attained by the columns of ordinary thermometers when subjected to a temperature of 212° F. For this purpose, the entire tube C is enclosed in the air-tight casing A; and the lower portion of the column, including the bulb, is surrounded by a metallic heat-absorbing and heat-reflecting element J, spaced from the bulb and column; and surrounding the said element and packed between the same and the lower portion of the tube C and bulb D is insulating material K, such as asbestos.

Assuming that the instrument has been exposed to a room temperature of approximately 70°, it may be graduated thereafter by inserting the same into boiling water for intervals of 3, 4, 5, 6, etc., minutes, for example, marking on the backing plate the position of the top of the column for each "interval" and applying to each mark the numeral denoting such interval.

In the use of my instrument, the degree of cooking, or internal condition, of the egg or other article which is being cooked can be ascertained at a glance. It is not even necessary that, in order to indicate the internal condition corresponding to actual boiling for, say three minutes, that the water in which the egg or other article is immersed shall actually be at a boiling temperature for such length of time. Assuming that the egg and the thermometer are at approximately the same temperature when immersed in water, the water may be at a temperature below the boiling point and be raised slowly up to the said point without being maintained at said point for any appreciable time thereafter. However, the instrument will indicate when the egg shall have been cooked to the consistency ordinarily imparted thereto by actually boiling it for the particular time indicated by the instrument.

For convenience in using my instrument, I prefer to provide the same with a ring L at the top thereof and also with a hook M at one side by which it may be hung within the vessel in which the articles are to be cooked.

It is not necessary that an instrument made in accordance with my invention shall be at approximately the same temperature as the egg when both the instrument and the egg are introduced into the water. Where eggs (or other articles with which my instrument is to be used) are kept in a refrigerator, at a temperature of say 50° F., the instrument may be also maintained at such temperature before calibration, thereby insuring extreme accuracy in enabling it to indicate correctly the degree of cooking of the egg.

Furthermore, while I have described herein the use of my instrument in connection with the cooking of eggs, it will be understood that I do not intend thereby to limit its use to eggs or even to articles of the same general character.

Still further, the instrument may be calibrated by words indicating the extent of cooking to which the article associated therewith has been subjected.

This is a substitute application for application No. 383,777, filed March 17, 1941.

Having thus described my invention, what I claim is:

1. An instrument of the character described comprising a thermometer bulb and indicating tube, heat-expansible and contractible liquid in the said bulb and tube, a casing surrounding and spaced from the bulb and the tube and having a transparent upper portion, a metallic heat-absorbing and reflecting element located within the casing and surrounding and spaced from the bulb and the lower portion of the tube, and a scale within the transparent portion of the casing at the back of the tube cooperating with the liquid in said tube.

2. An instrument of the character described comprising a thermometer bulb and indicating tube, heat-expansible and contractible liquid in the said bulb and tube, a casing surrounding and spaced from the bulb and the tube and having a transparent upper portion, a metallic heat-absorbing and reflecting element located within the casing and surrounding and spaced from the bulb and the lower portion of the tube, insulating material within the casing and surrounding the said heat-absorbing and reflecting element and the bulb and the lower portion of the tube, and a scale within the transparent portion of the casing at the back of the tube cooperating with the liquid in said tube.

ELLSWORTH S. HANN.

REFERENCES CITED

The following references are of record in the file of this patent:

UNITED STATES PATENTS

| Number | Name | Date |
|---|---|---|
| 1,004,947 | Watkins | Oct. 3, 1911 |
| 1,729,298 | Stewart | Sept. 24, 1929 |

FOREIGN PATENTS

| Number | Country | Date |
|---|---|---|
| 327,040 | Great Britain | Mar. 27, 1930 |